United States Patent [19]

Ebert

[11] Patent Number: 5,507,252
[45] Date of Patent: Apr. 16, 1996

[54] WASTE SEPARATING CAT LITTER BOX

[76] Inventor: Michael A. Ebert, R.R. #4, Lot 20 Concession 11, Thamesford Ontario, Canada, N0M 2M0

[21] Appl. No.: 306,408

[22] Filed: Sep. 15, 1994

[51] Int. Cl.$^6$ .................................................. A01K 1/035
[52] U.S. Cl. ........................................................ 119/166
[58] Field of Search .................................... 119/165, 166; 209/370, 373, 374, 251, 252, 359

[56] References Cited

U.S. PATENT DOCUMENTS

| | | | |
|---|---|---|---|
| 4,522,150 | 6/1985 | Gershman | 119/165 |
| 4,886,014 | 12/1989 | Sheriff | 119/166 |
| 5,107,797 | 4/1992 | La Roche | 119/166 |
| 5,167,204 | 12/1992 | Nussle | 119/166 |
| 5,178,099 | 1/1993 | Lapps et al. | 119/166 |
| 5,402,751 | 4/1995 | De La Chevrotiere | 119/166 |

*Primary Examiner*—Todd E. Manahan

[57] ABSTRACT

A prism shaped in the form of a truncated obround, has one end defining an aperture through which a cat can enter. Internally, the hedron defines a plenum but transcending through a sector of the hedron, the plenum is sub-divided into a first and second sub-plenum by a sieve preferably in the shape of a plurality of spatially disposed parallel slats extending from front to rear. On the upper margin of the sieve is a collection station adapted to collect solid and urine saturated waste from a cat. The interior of the hedron is partially filled with granular cat litter and on defecation of a cat, the solid and urine saturated waste are consumed, in part, by the cat litter. On rotation in one direction and counter-rotation in the other direction, the cat litter is passed through the sieve into the second sub-plenum while at the same time, the solid waste and urine saturated waste pass over the screen into a collection station where they are collected on the moment of counter-rotation which step also causes the clean cat litter in the second sub-plenum to flow back into the first sub-plenum which is in communication with the aperture.

5 Claims, 5 Drawing Sheets

PRIOR ART

1

WASTE SEPARATING CAT LITTER BOX

This invention relates to a litter box for cats.

BACKGROUND TO THE INVENTION

Various proposals over the years have been suggested for the purposes of creating an apparatus for the mechanical separation of cat solid waste randomly buried in cat litter. The cat litter is generally entrained not only with the solid waste but is saturated with cat urine waste that coalesces the cat litter into clumps. Separating the urine clumps of waste and solid waste is not an enjoyable task.

Various proposals have been proposed. For instance, PIERSON in U.S. Pat. No. 4,846,104 issued 17 Oct., 1978 discloses an AUTOMATED CAT TOILET featuring a rotary drum with an internal sieve member that is a fixed member within the cylinder and on rotation of the cylinder, passes through the cat litter to collect the solid waste and the clumps of saturated urine litter and upon further spinning, discharges them out of the cylinder into a collection region or tray beneath the same.

CARTER in U.S. Pat. No. 1,128,264 issued on 17 Oct., 1978 discloses a SANITARY FACILITY FOR PETS, being a rotatable drum chamber that accomplishes the same.

These inventions are cumbersome, have moving parts, and are expensive.

THE INVENTION

I have conceived of a prism or hedron that, in lateral cross-section, is a truncated obround and having at one end, an aperture through which a cat can enter. Internally, transcending through a sector of the hedron is a sieve, which partitions the hedron into two communicating sub-plenums. The sieve therefore extends from a lower peripheral side of the obround toward the other parallel side of the obround. The sieve is a plurality of parallelly disposed and inclined spatially disposed strips or slats and a removable collection means or tray slidingly insertable at the upper end of the screen so as to periodically collect the solid waste or saturated urine litter clumps, after a self-contained litter cleaning, or sieving step, is performed in a fashion that will become apparent.

Particularly, rotation clockwise and counter-clockwise steps are needed in order to rotate the hedron, along its longitudinal axis, in either direction, one direction causing the separation from the granular or loose cat litter, of urine saturated litter clumps and solid wastes from the loose litter, conveying the separated items from the loose litter into a collection bin, and on counter rotation, placing the collection bin at an upper elevated position so that it may be removed and the contents discarded and then the collection bin for tray re-insertion.

In this respect, it is contemplated that the collection tray be located entirely within the housing or hedron but is removable therefrom so that its contents can be removed.

The invention has particular advantage, over the prior art, in that there is a mechanical separation of the clumps and solid waste, from the granular cat litter, but without using automated motors or machines, gears and the like, which substantially increases the costs, as noted in the earlier prior art cited, and also does not require chemical separation.

One of the features of the invention is to provide, along a core of the semi-circle, a slatted grill which acts as the sieve to segregate the loose litter from the urine saturated clumps and the solid wastes and that also conveys the lateral two into the removable collection tray and that acts as a wall which holds the clean litter in the second plenum location when in the inverted position.

The invention therefore contemplates a cat litter box adapted to provide a station for cat litter and for cleaning the litter of solid waste and urine saturated litter waste arising from defecation of a cat, and for depositing the same in a collection station comprising a hedron, defining a plenum, having opposite ends with an outer convex surface and a truncated side surface, one of the ends defining an aperture sized to accommodate the passage of a cat into and out of the hedron, a slatted grill means mounted within the hedron, partitioning the plenum into a first and a second sub-plenum, the first sub-plenum communicating with the aperture, the screen means adapted to pass cat litter through the same for temporary storage in the second plenum and a removable collection station communicating with said first plenum mounted adjacent said slatted grill and adapted to receive the solid waste and urine saturated waste on rotation of the hedron in one direction during which time the cat litter passes through the slatted grill into the second sub-plenum, and on counter-rotation of the same, causes the thence clean cat litter in the second sub-plenum to pass back into the first sub-plenum. Particularly, the litter box is a truncated obround and the slatted grill has a spacing of about No. 6 to 8 but preferably is composed of a family of spatially disposed parallel inclined slats. Additionally, a removable collection tray is positioned at a collection station adjacent to the screen to capture waste, as will become apparent.

The invention further contemplates a method of cleaning cat litter, of solid waste, and urine saturated waste, comprising the steps of selecting a hedron which has one convex side, and an aperture in one end adapted to accommodate the passage of a cat into and out of the hedron, the hedron defining a plenum, partitioning the plenum with a slatted grill into a first and second sub-plenum, placing at one upper end of the screen, a waste collection station, placing within the plenum cat litter, subsequent to it being soiled by a cat and rotating the plenum in one direction to clean cat litter into the second which is held in location because of the slats, thence, counter rotating the hedron so as to cause re-pass of the cat litter from the second plenum into the first while at the same time, depositing solid waste and urine saturated waste in the collection station.

BRIEF DESCRIPTION OF THE DRAWINGS

The invention will now be described by way of example and reference to the accompanying drawings in which:

FIGS. 4B through 4E being successive rotational positions of the litter box of FIG. 2 showing the separating and cleaning of the litter, of the saturated urine clumps and of solid waste from the balance of the litter.

Referring to FIG. 1 and the prior art, there is demonstratively shown a litter tray (10), according to the prior art, containing cat litter (11) and cat (6) performing its duties therein.

Figure 1:
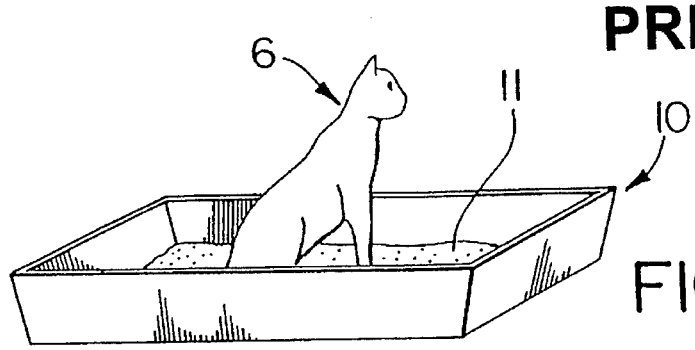
FIG. 1 is a perspective view of the prior art.
Figure 2:
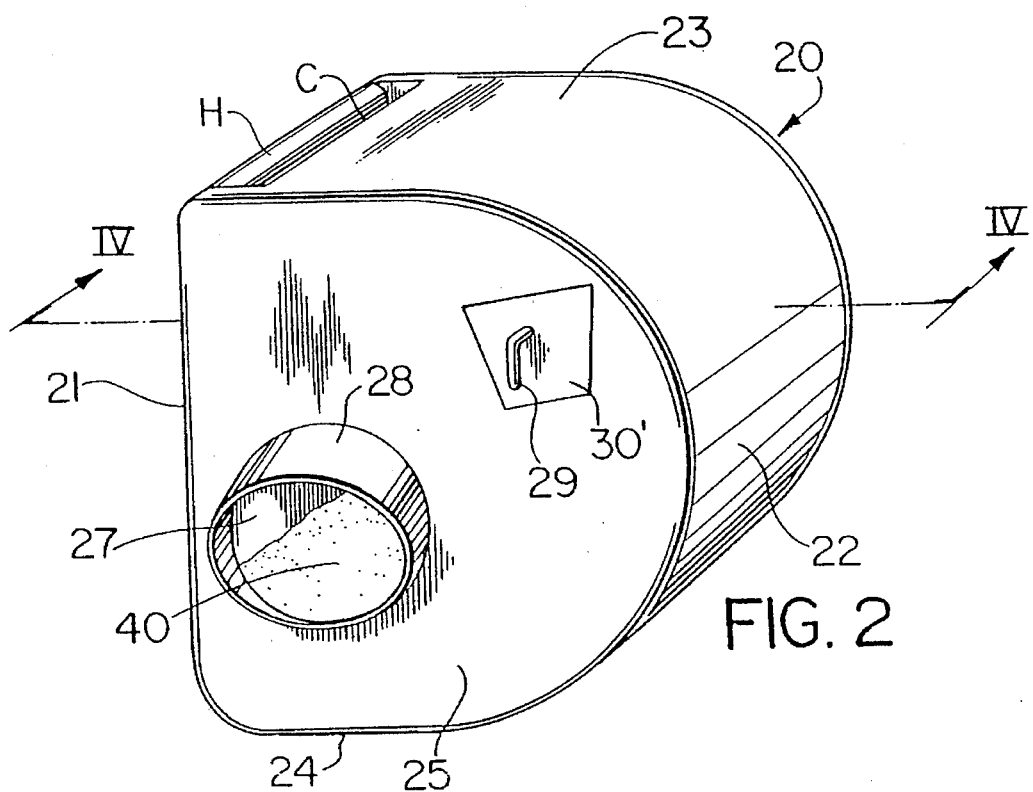
FIG. 2 is a perspective view of the embodiment of the invention.

Referring to the preferred embodiment of the invention and FIG. 2, a hedron is generally shown as (20) and in lateral cross-section, is shaped as a truncated obround with a straight planar truncation side (21), a semi-circular opposite surface (22), flat straight top and bottom surfaces (23,24), the latter two of which are respectively parallel to each other; a forward and rearward flat faces or ends (25) and (26). Although described as a truncated obround, the hedron might be a semi-circular, in section, cylinder because it will be apparent hereafter that the semi-circular opposite surface (22) makes it most convenient for clockwise and counter-clockwise rotation of the hedron in order to "sieve" and to separate from the granular cat litter, solid waste and urine saturated waste that coalesces with the litter. The forward and rearward faces or ends (25) and (26). The forward face or end (25) defines a cat accommodating aperture (27) with an outwardly extending slightly downwardly inclining peak (28) extending from the upper portion of the perimeter of the aperture (27). A collection tray handle (29) extends from a collection tray (30) front end (30') that extends through an aperture (27) defined in the front face (25). The tray front end (30') is but one end of a collection tray, more clearly seen in FIG. 5 and referenced as (30), and consists of a longitudinal element (31) formed with a U-shaped lateral cross-section, as more clearly seen in FIGS. 4, the upper perimeter (32) which is rectangular, in plane, and provides means for collection of the solid waste (40) and clump waste (41) entrained in the granular litter (42), as will be described.

Figure 4A:
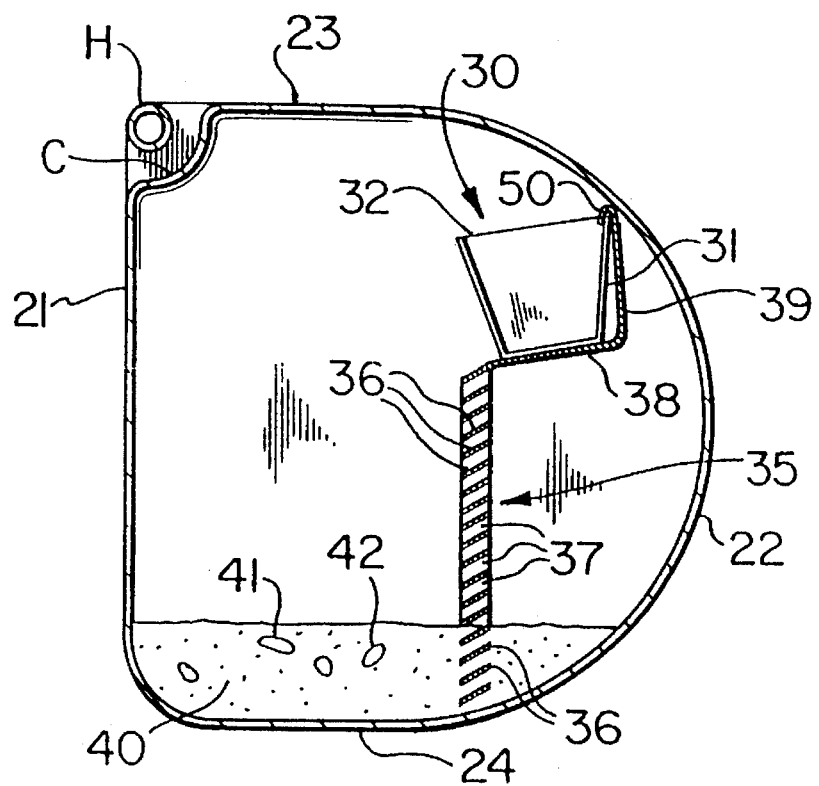
FIGS. 4A through 4E are respective sections along IV—IV of FIG. 2, FIG. 4A showing the rest position of the litter box, according to the invention, for the purposes of receiving cat waste.
Figure 4B:
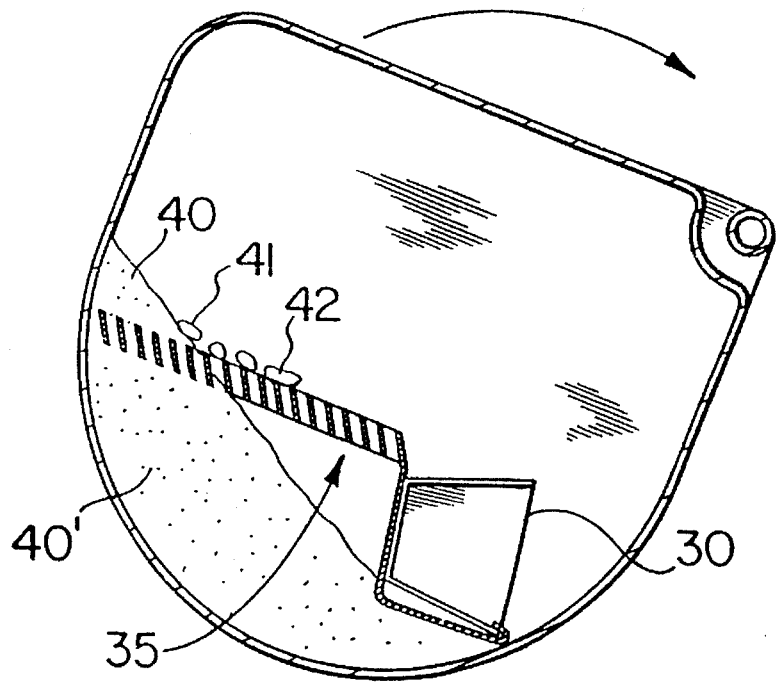
Figure 4C:
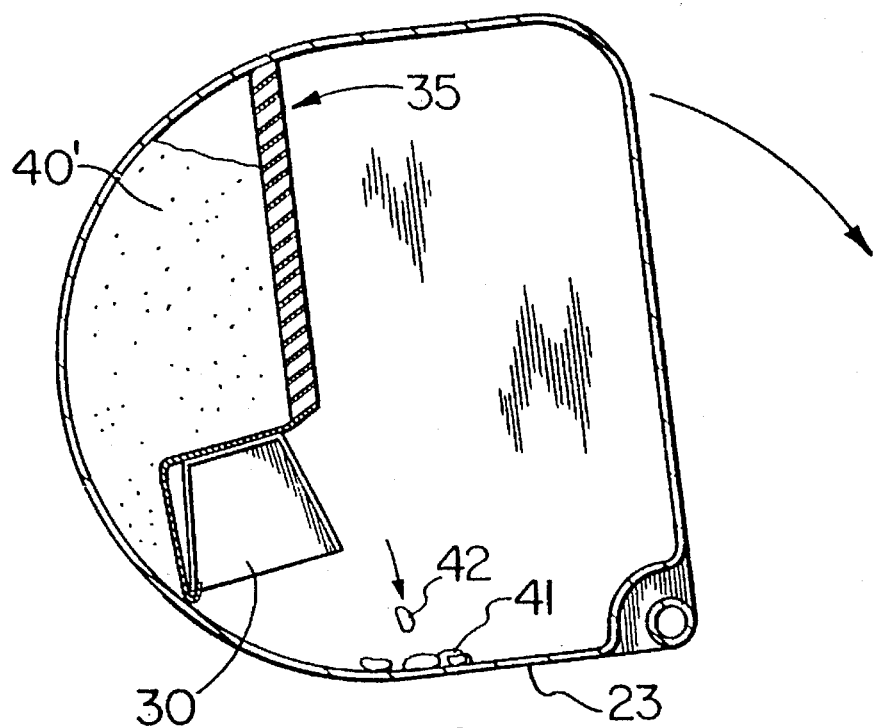
Figure 4D:
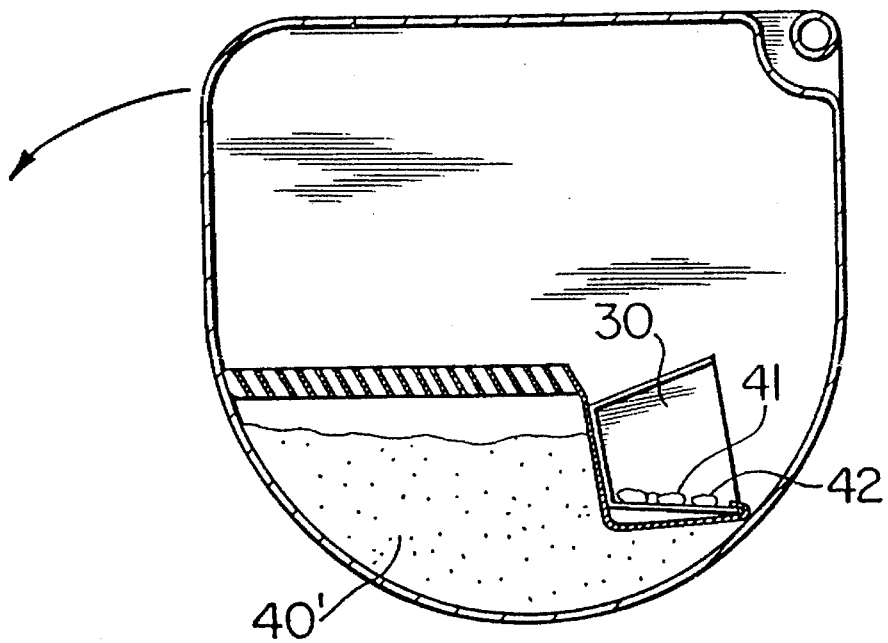
Figure 4E:
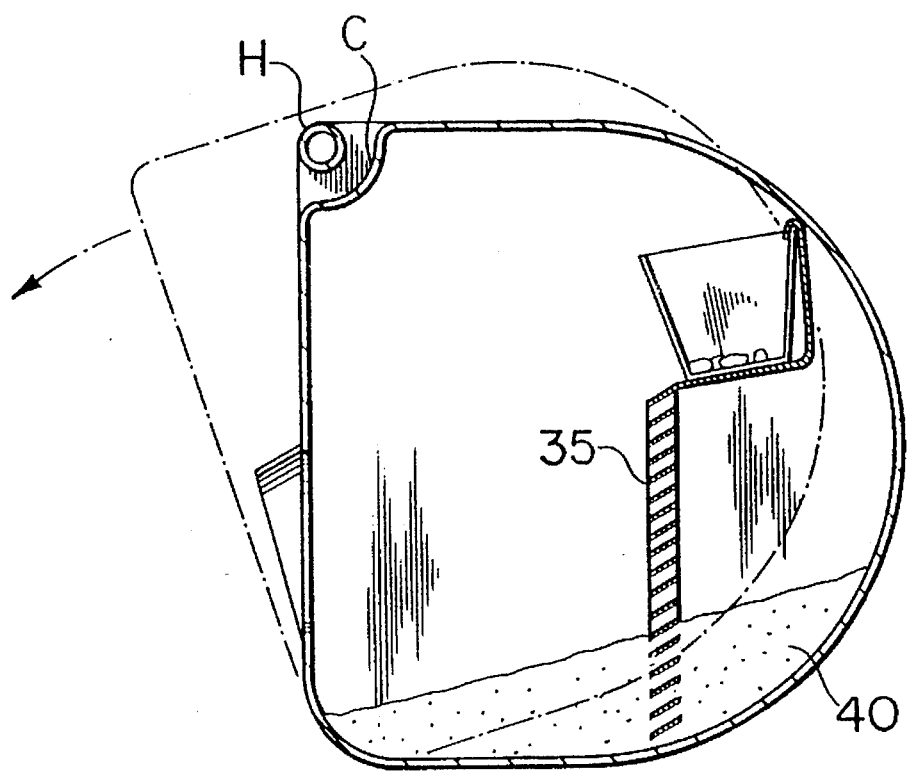
Figure 5:
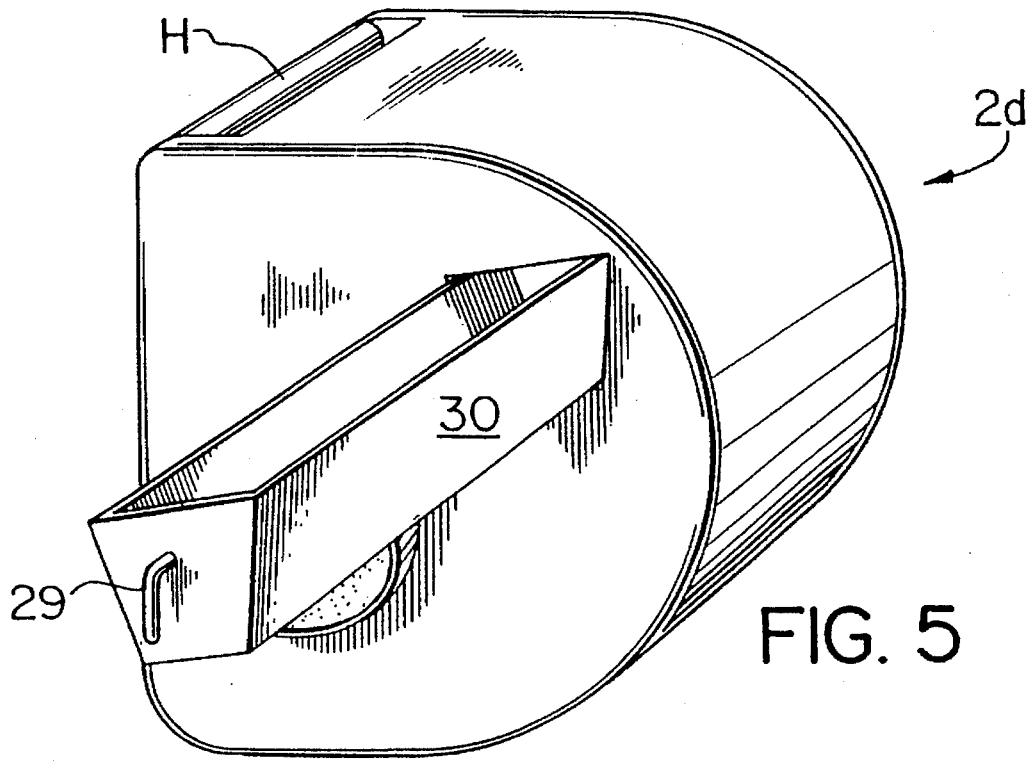
FIG. 5 is a perspective view of the collection tray removal step of urine saturated clumps and solid waste, after the cleaning steps by counter-rotating from FIG. 4E through and back to FIG. 4A.

Referring to the perspective views of FIGS. 2 and 5 in the upper left-hand corner of the obround hedron (20), and extending from front face (25) to the rear face (26) is a handle (H) which assists in the rotation and counter-rotation of the litter box (20) so as to accomplish the cleaning steps, depicted in FIGS. 4A through 4E. In that respect, the outer profile of the hedron steps through a concave surface (C) to a accommodate the handle (H). It will apparent to those skilled in the art that the handle (H) need not extend the full length of the litter box but may be truncated so as to only extend either from the front face (25) rearward or from the rear face (26) forward some distance so as to provide a gripping region for one's hand by which the rotation of the litter box may be easily accomplished.

Referring to FIGS. 4A through 4E and particularly 4A, within the litter box (20) is a screen (35) which extends from the front face (25) to the rear face (26) and consists of a plurality of parallel rectangular strips or slats (36), spatially disposed about ⅓ of an inch to 1 inch (0.8 cm to 2.54 cm), preferably ½ inches, one from the other, and having a width, of each slat, of about 3/32 inch (0.24 cm), although this dimension is not critical, and an inclination at an angle relative to the plane of the screen of about 30° in the fashion shown so as to provide a longitudinal inclined aperture (37) between each adjacently disposed slats (36). When this slat size and space is used, this translates into a slatted grill with spacing of approximately No. 7 but generally in the range from about No. 6 to No. 8. The slatted grill (35) extends vertically along the diameter of the semi-circular face (25) of the obround, as most clearly seen in FIGS. 4 to an extent of little over 50% or 60% of the diameter, thence, steps into an L-shaped portion having a bottom tray-supporting surface (38) and an upward extending side (39). The inner surface of the obround end surface (22) has a glide rail (50) extending from the inner side of the obround (22), from front face (25) to back face (26). The tray (30) has its right-hand upper margin (32) of such length or height so as to slide between the glide rail (50) and the inner surface of the obround end (26). The glide rail (50) is slightly inclined so the tray side margin (32') engages between the glide rail and the inner side of the opposite semi-circular surface (22). By judicially selecting the dimension of the bottom tray-supporting surface (38) and the upward extending side (39) relative to the height of the perimeter (32) to the bottom of the tray (30), the same is "locked in" when fully pushed into the litter box (20). If the forward face cat accommodating aperture (26) is configured so that in fact that aperture is contoured and has marginal upper notches (29') and (29"), these notches will accommodate the upper longitudinal perimeter (32) of the tray (30) and hence, "lock the tray" into position onto the tray-supporting surface (38) and the upward extending side (39). On rotation of the litter box (20), the tray is fixedly held there and will collect the waste in the following fashion.

Referring to FIG. 4, the litter is generally shown as (40) and consists of solid waste (41) and clump waste (42). On rotation and referring to FIG. 4B, the litter (40) begins to pass through the slatted grill (35) while the solid waste and urine saturated clumps (41) and (42) sit on the upper surface of the slatted grill (35), as shown in FIG. 4B. On further rotation, and now referring to FIG. 4C, the clumps fall to the inner surface of the top side (23) and all of the litter has passed through the slatted grill (35) so as to be clean litter (40'). Continual rotation in the clockwise direction occurs so that the top surface (23) is flush with the ground. Thence, as counter-rotation begins to occur, and now referring to FIG. 4D, the solid waste and saturated clumps (41) and 42) slide into the collection tray (30) and as seen in FIG. 4E, the cleaned litter (40') slides back through the slatted grill (35) to occupy and become litter (40), as in FIG. 4A.

Figure 3:
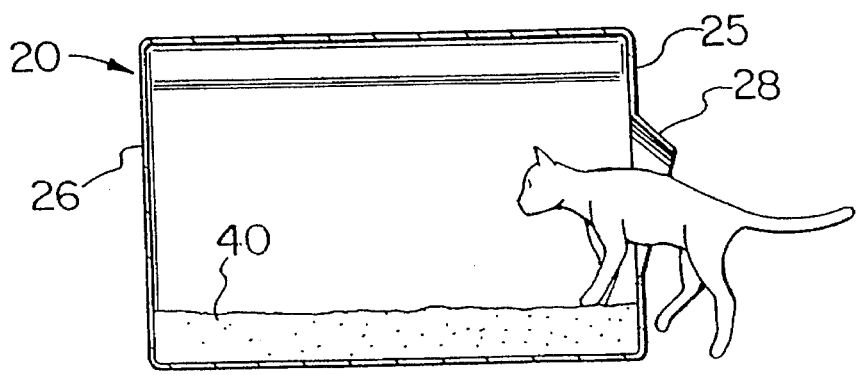
FIG. 3 is an x-ray view of the interior, and side elevational view, of the litter box according to FIG. 2.

Referring to FIG. 4E, the solid portion represents the counter-clockwise return position of the litter box, according to the invention while the phantom position illustrates, an overturn on counter rotation of approximately 15°–20° so that the cat litter (40), which has now been cleaned, assumes the flat attitude as that of originally shown in FIG. 3 and 4. In that respect, the bottom corner or intersection between the truncated side (40) and the bottom surface (24) should be rounded or convex, as this allows simplistic movement for the counter rotation overturning.

Figure 6:
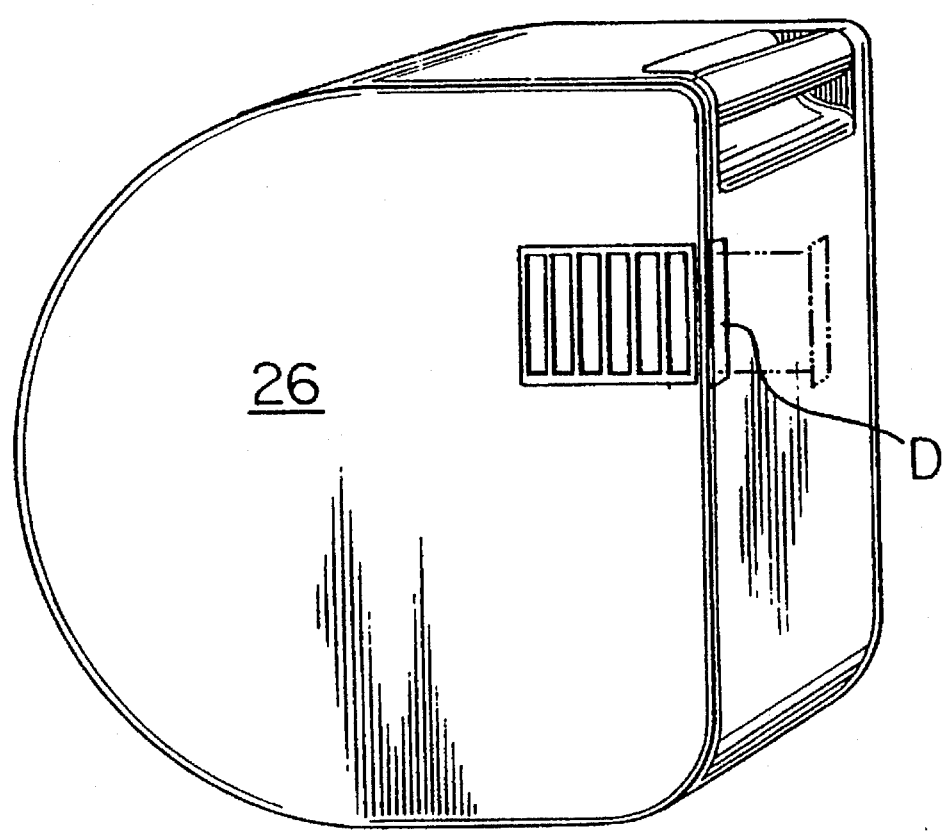
FIG. 6 is a rear perspective view of an alternative embodiment showing a rear surface removable deodorizer.

For deodorizing the hedron, of the smells from defecation, the back wall, and now referring to FIG. 6, may have a removable deodorizer tray (D) which can be slipped out of and slipped back into the hedron since a track is provided in the rear inner surface wall (26) of the hedron.

I claim:

1. A litter box for separating animal wastes from litter material comprising:

an enclosure defining a plenum and shaped as a truncated obround with a planar truncation side; a semi-circular side opposite said truncation side; planar, substantially parallel top and bottom surfaces; and planar, substantially parallel front and rear ends;

dividing means vertically disposed in said enclosure between said truncation side and said semi-circular side and extending horizontally from said front end to said rear end for dividing said plenum into first and second sub-plenums; said first sub-plenum being located between said truncation side and said dividing means and said second sub-plenum located between said separation means and said semi-circular side; said dividing means including a separation grill adjacent said bottom face for separating animal wastes from the litter material;

an aperture in said front end sized to permit passage of a cat into and out of said first plenum; and an imperforate collection tray disposed within said first sub-plenum above, and adjacent to said separation grill;

whereby, in use, the litter box is positioned such that the bottom surface rests upon a floor with litter material disposed within the first sub-plenum and after usage of the litter box by the cat, the litter box is rotated in a first direction by rolling the semi-circular side upon the floor until the top surface is resting upon the floor thereby causing the litter material to pass through the separation grill into the second sub-plenum while animal wastes are separated therefrom and retained in the first sub-plenum, and thereafter the litter box is rotated in a second, opposite direction by rolling the semi-circular side upon the floor until the bottom surface is again resting upon the floor thereby causing the litter material to pass back through separation grill and into the first sub-plenum while the animal waste is deposited and retained in the collection tray.

2. The litter box as set forth in claim 1, wherein said separation grill comprises a plurality of inclined slats spatially disposed from one another so that the litter material may freely pass therethrough while wastes are retained thereby.

3. The litter box as set forth in claim 1, wherein said separation grill lies in a substantially vertical plane and comprises a plurality of inclined slats spatially disposed from one another so that the litter material may freely pass therethrough while wastes are retained thereby; said slats extending longitudinally from said front end to said rear end of said enclosure and being disposed at an angle of inclination of about 30 degrees relative to the plane of said separation grill.

4. The litter box as set forth in claim 1, wherein said front end of said enclosure includes an opening and said collection tray is received in said opening, whereby said collection tray may be readily removed from said enclosure and emptied.

5. The litter box as set forth in claim 1, wherein the collection tray comprises a longitudinally disposed tray having an upper side edge, and said litter box further includes means for holding said tray in juxtaposition above said separation grill with said upper side edge of said tray held against said semi-circular side of said enclosure.

* * * * *